United States Patent
Dehlin (10) Patent No.: US 7,535,481 B2
(45) Date of Patent: May 19, 2009

(54) ORIENTING INFORMATION PRESENTED TO USERS LOCATED AT DIFFERENT SIDES OF A DISPLAY SURFACE

(75) Inventor: Joel P. Dehlin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 835 days.

(21) Appl. No.: 10/880,006

(22) Filed: Jun. 28, 2004

(65) Prior Publication Data

US 2005/0285845 A1 Dec. 29, 2005

(51) Int. Cl.
*G09G 5/00* (2006.01)

(52) U.S. Cl. .................... 345/659; 345/156; 345/173

(58) Field of Classification Search .................... None
See application file for complete search history.

(56) References Cited

U.S. PATENT DOCUMENTS 4,992,650 A 2/1991 Somerville .................. 235/462

OTHER PUBLICATIONS

Shen et al., "DiamondSpin: An Extensible Toolkit for Around-the-Table Interaction", Apr. 2004, ACM, pp. 167-174.*
Title: Display and Presence Disparity in Mixed Presence Groupware, Author: Tang et al., Date: Jan. 18-22, 2004, Source: 5th Australian User Interface Conference, Australian Computer Society, Inc.*
"3.6 Interpolation in Two or More Dimensions." Numerical Recipes in C: The Art of Scientific Computing. Chapter 3. Interpolation and Extrapolation. © 1988-1992, Cambridge University Press. Numerical Recipes Software. pp. 123-128.
"Bar Code 1, 2-Dimensional Bar Code Page." Available http://www.adams1.com/pub/russadam/stack.html. Printed Jan. 20, 2004. 14pp.
Ambiente article. "InteracTable®." Dated Jul. 7, 2000. Available http://www.darmstadt.gmd.de/ambiente/activities/interactable.html. Printed Nov. 21, 2003. 3pp.
Bier, Stone, Pier, Buston, and DeRose. "Toolglass and Magic Lenses: The See-Through Interface." *Proceedings of Siggraph '93* (Anaheim, August). Computer Graphics Annual Conference Series, ACM, 1993, pp. 73-80. 8pp.
Blickenstorfer, Conrad H. "First Look: Acer TravelMate TM100 with Windows XP Tablet PC Edition." Pen Computing Magazine. Jul. 2002. pp. 44-47.

(Continued)

*Primary Examiner*—Kee M Tung
*Assistant Examiner*—Jwalant Amin
(74) *Attorney, Agent, or Firm*—Workman Nydegger (57) ABSTRACT

Information is oriented when presented to a user on a display surface, so that the information can be readily read and/or used by the user. The information is displayed on a generally horizontal display surface to users who may be located at different positions around the display surface. A different totem is associated with each user. The identity and position of each totem on the display surface is determined in response to a detected characteristic of the totem, such as a pattern of infrared light reflected from the totem. Either the location of a user's totem relative to a center of the display surface, or a quadrant of the display surface near where the user is located, or an orientation of the user's totem on the display surface can determine the orientation and location of the information presented to the user on the display surface.

11 Claims, 7 Drawing Sheets

OTHER PUBLICATIONS

"DiamondSpin—Begs for Direct Manipulation Technology Is it the Pen? Sony Leaps Out-of-the-Box Again with Gummi." Mitsubishi/DiamondSpin. CHI 2004 #3. Printed Apr. 30, 2004. 5pp.

Dietz and Leigh. "DiamondTouch: A Multi-User Touch Technology." *UIST '01* Orlando FLA. © ACM 2001 1-58113-438 -x/01/11. CHI Letters 3 (2). Nov. 11-14, 2001. pp. 219-226.

Electronic Check Alliance Processing, Inc. "Gift Cards, How Stored Value Card Systems Work." Available. http://www.electron-cap.com/GiftCards.htm. Printed Jan. 20, 2004 and May 16, 2004. © 2003. 2pp. total (3pp printed).

Fukuchi and Rekimoto. "Interaction Techniques for SmartSkin." *ACM UIST2002 demonstration*, 2002. 2pp.

Grabowski, Robert. "A Miniature Video Laser Range Finder for Small Robots." Available http://www.andrew.cmu.edu/~rjg/research/research_hardware/laser_rangefinder.html. Printed May 16, 2004. 8pp.

Grant and Winograd. "Flexible, Collaborative Organization on a Tabletop." *ACM CSCW 2002: Workshop on Co-located Tabletop Collaboration: Technologies and Directions*. New Orleans, LA. Nov. 2002. pp. 1-4.

Horn, Berthold K. P. "Robot Vision." The MIT Press. Available http://mitpress.mit.edu/catalog/item/default.asp?ttype=2&tid=8388. Printed Dec. 17, 2003. 6pp. total.

Horn, Berthold Klaus Paul. "Robot Vision." Binary Images: Topological Properties. The MIT Electrical Engineering and Computer Science Series. 1986. pp. 66-71 and cover page(s).

Hunter, Andrew. "Connected Components Analysis (Computer Vision)." www.google.com search results http://www.google.com/search?sourceid=navclient&q=connected+component+ellipse. Printed Mar. 7, 2004. Article dated Sep. 24, 2002. 2pp search results, 21pp article.

"IR Distance Sensor." Available http://www.diyelectronics.com/Accessories/IRDS.html (2pp) and http://www.diyelectronics.com/Accessories/GP2D05.html (1pg). Printed Dec. 30, 2003. 3pp.

Ishii and Ullmer. "Tangible Bits: Towards Seamless Interfaces between People, Bits and Atoms." *Proceedings of CHI '97*, Mar. 22-27, 1997, Atlanta, Georgia. © 1997 ACM 0-89791-802-9/97/03. pp. 1-8.

Ishii, Wisneski, Orbanes, Chun, and Paradiso. "PingPongPlus: Design of an Athletic-Tangible Interface for Computer-Supported Cooperative Play." *Proceeding of CHI '99*, May 15-20, 1999, © 1999 ACM. pp. 1-8.

Johanson, Kolodny, and Russell. "A Hand pose and Position Tracker for the Interactive Table." CS223B Final Project. Available http://graphics.stanford.edu/~drussel/vision/tracker-report.html. Printed Dec. 16, 2003, 6pp.

Ju, Hurwitz, Judd, and Lee. "CounterActive: An Interactive Cookbook for the Kitchen Counter." *Extended Abstracts of CHI 2001*, Seattle. Apr. 2001. pp. 269-270.

Kang, Sing Bing. "Radial Distortion Snakes." *IAPR Workshop on Machine Vision Applications (MVA2000)*, Tokyo, Japan. Nov. 2000. pp. 603-606.

Kato, Billinghurst, Poupyrev, Imamoto, and Tachibana. "Virtual Object Manipulation on a Table-Top AR Environment." *IEEE and ACM Int'l Symposium on Augmented Reality 2000, ISAR '2000*, Oct. 5-6, 2000, Munich. 9pp.

Klemmer, Newman, and Sapien. "The Designer's Outpost: A Task-Centered Tangible Interface for Web Site Information Design." *Proceedings of Human Factors in Computing Systems: CHI 2000 Extended Abstracts*. The Hague, The Netherlands. Apr. 1-6, 2000. pp. 333-334.

Klemmer, Newman, Farrell, Bilezikjian, and Landay. "The Designers' Outpost: A Tangible Interface for Collaborative Web Site Design." *CHI Letters, The 14th Annual ACM Symposium on User Interface Soft Technology: UIST 2001*. 3(2). pp. 1-10.

Kobayashi, Hirano, Narita, and Ishii. "A Tangible Interface for IP Network Simulation." *CHI 2003*, Apr. 5-10, 2003, Ft. Lauderdale, FL ACM 1-58113-630-7/03/0004. 2pp.

Koike, Sato, and Kobayashi. "Integrating Paper and Digital Information on EnhancedDesk: A Method for Realtime Finger Tracking on an Augmented Desk System." *ACM Transaction on Computer-Human Interaction*, vol. 8 No. 4, Dec. 2001. © 2001 ACM 1073-0516/01/1200-0307. pp. 307-322.

Leibe, Starner, Ribarsky, Wartell, Krum, Singletary, and Hodges. "The Perceptive workbench: Toward Spontaneous and Natural Interaction In Semi-Immersive Virtual Environments." *Proceedings of the IEEE Virtual Reality 2000 Conference*, Mar. 18-22, 2000. New Brunswick, New Jersey: IEEE Computer Society, 2000. 8pp.

Leigh and Dietz. "DiamondTouch Characteristics and Capabilities." Mitsubishi Electric Research Laboratories, Cambridge, Massachusetts, USA. Updated. 2pp.

Magerkurth, Stenzel, and Prante. "Stars—A Ubiquitous Computing Platform for Computer Augmented Tabletop Games." *5th International Conference on Ubiquitous Computing (Ubicomp '03)*, Oct. 12-15, 2003, Seattle, Washington. 2pp.

Malandain, Grégoire. "Connected Components Extraction." Available http://www-sop.inria.fr/epidaure/personnel/malandain/segment/connexe.html. Printed Dec. 18, 2003. 3pp.

Matsushita and Rekimoto. "HoloWall: Designing a Finger, Hand, Body, and Object Sensitive Wall." *UIST '97* Banff, Alberta, Cananda. © 1997 ACM 0-89791-881-9/97/10. pp. 209-210.

Missouri Department of Revenue. "2D Barcode Technology." Undated. 3pp.

Moran, Saund, van Melle, Gujar, Fishkin, and Harrison. "Design and Technology for Collaborage; Collaborative Collages of Information on Physical Walls." *UIST '99*. Asheville, NC. © 1999 ACM 1-58113-075-9/99/11, CHI Letters vol. 1, 1. pp. 197-206.

Pangaro, Maynes-Aminzade, and Ishii. "The Actuated Workbench: Computer-Controlled Actuation in Tabletop Tangible Interfaces." *Proceedings of UIST 2002*, Oct. 27-30, 2002. © 2002 ACM. 10pp.

Paradiso, Hsiao, Strickon, Lifton, and Adler. "Sensor systems for interactive surfaces." *IBM Systems Journal*, vol. 39, Nos. 3 & 4, 2000. pp. 892-914.

Patten, Ishii, Hines, and Pangaro. "Sensetable: A Wireless Object Tracking Platform for Tangible User Interfaces." *Proceedings of CHI 2001*, Mar. 31-Apr. 5, 2001, ACM Press, © 2001 ACM. 8pp.

Patten, Recht, and Ishii. "Audiopad: A Tag-based Interface for Musical Performance." *Proceedings of Conference on New Interface for Musical Expression (NIME '02)*. Dublin, Ireland, May 24-26, 2002. 6pp.

Ramos and Balakrishnan. "Fluid Interaction Techniques for the Control and Annotation of Digital Video." *UIST '03* Vancouver, B.C., Canada. © 2003 ACM 1-58113-636-06/03/0010. pp. 105-114.

Rekimoto and Ayatsuka. "CyberCode: Designing Augmented Reality Environments with Visual Tags." *Proc. of UIST 2000*, 2000. 10pp.

Rekimoto and Matsushita. "Perceptual Surfaces: Towards a Human and Object Sensitive Interactive Display." *Proceedings of Workshop on Perceptural User Interactes (PUI'97)*, 1997. 3pp.

Rekimoto and Nagao. "The World through the Computer: Computer Augmented Interaction with Real World Environments." *Proceedings of UIST'95*, 1995. pp. 29-36.

Rekimoto and Saitoh. "Augmented Surfaces: A Spatially Continuous Work Space for Hybrid Computing Environments." *CHI '99*, May 15-20, 1999. Pittsburgh, Pennsylvania. © ACM 1999 0-201-48559-1/99/05. pp. 378-385.

Rekimoto, Jun. "Matrix: A Realtime Object Identification and Registration Method for Augemented Reality." *Proc. of Asia Pacific Computer Human Interaction (APCHI '98)*, 1998. 6pp.

Rekimoto, Jun. "Multiple-Computer User Interfaces: 'Beyond the Desktop' Direct Manipulation Environments." *ACI CHI2000 Video Proceedings*, 2000. 2pp.

Rekimoto, Jun. "Pick-and-Drop: A Direct Manipulation Technique for Multiple Computer Environments." *Proceedings of UIST'97*, 1997. pp. 31-39.

Rekimoto, Jun. "SmartSkin: An Infrastructure for Freehand Manipulation on Interactive Surfaces." *CHI 2002*, Apr. 20-25, 2002, Minneapolis, Minnesota. © 2001 ACM 1-58113-453-3/02/0004. 8pp.

Rekimoto, Ullmer, and Oba. "DataTiles: A Modular Platform for Mixed Physical and Graphical Interactions." *SIGCHI'01*, Mar. 31-Apr. 4, 2001, Seattle, WA. © 2001 ACM 1-58113-327-8/01/0003. 8pp.

Reznik, Canny, and Alldrin. "Leaving on a Plane Jet." *2001 Int. Conf. on Intell. Robots & Systems (IROS)*, Maui, Hawaii, Oct. 2001. 6pp.

Ringel, Gerh, Jin, and Winograd. "Barehands: Implement-Free Interaction with a Wall-Mounted Display." Short Talks. *CHI 2001* Mar. 31-Apr. 5. pp. 367-368.

Rosenfeld, Zawadzki, Sudol, and Perlin. "Planar Manipulator Display." New York University mrl. NYU Media Research Lab. Available http://cat.nyu.edu/PMD. Printed May 16, 2004. 3pp.

Rovani, David (Posted by). "My Second Month with the Compaq Tablet." *Home>Reviews, TablePCHome.com—Table PC user community*. Posted Apr. 10, 2003. Available http://www.tabletpchome.com/Messages.aspx?ThreadID=140. Printed Dec. 30, 2003. pp. 1-2 of 5.

Schmalstieg, Encarnação, and Szalavári. "Using Transparent Props for Interaction With The Virtual Table." Presented at *1999 ACM Symposium on Interactive 3D Graphics (13DG '99)*. Apr. 26-28, 1999, Atlanta, GA. 7pp.

Scott, Grant, and Mandryk. "System Guidelines for Co-located collaborative Work on a Tabletop Display." *Proceedings of ECSCW'03, European Conference Computer-Supported Cooperative Work 2003*, Helsinki, Finland, Sep. 14-18, 2003. 20pp.

Shen, Everitt, and Ryall. "UbiTable: Impromptu Face-to-Face Collaboration on Horizontal Interactive Surfaces." © Mitsubishi Electric Research Laboratories, Inc., 2003. Cambridge, Massachusetts. TR-2003-49. Sep. 2003. 10pp.

Shen, Lesh, and Vernier. "Personal Digital Historian: Story Sharing Around the Table." *Interactions*. Mar.+Apr. 2003. pp. 15-22.

Shen, Lesh, Bernier, Forlines, and Frost. "Sharing and Building Digital Group Histories." *CSCW'02*, Nov. 16-20, 2002, New Orleans, Louisiana. © 2002 ACM 1-58113-560-2/02/0011. 10pp.

Shen, Lesh, Moghaddam, Beardsley, and Bardsley. "Personal Digital Historian: User Interface Design." © Mitsubishi Electric Research Laboratories, Inc. 2001. Cambridge, Massachusetts. 5pp.

Shen, Vernier, Forline, and Ringel. "DiamondSpin: An Extensible Toolkit for Around-the-Table Interaction." *CHI 2004*, Apr. 24-29, 2004, Vienna, Austria. © 2004 ACM 1-58113-702-8/04/0004. 8pp.

Smart Technologies Inc. White Paper. "DViT Digital Vision Touch Technology." Feb. 2003. 10pp.

Smart Technologies, Inc. "Rear Projection Smart Board™ Interactive Whiteboard" "Smart Board Software". Available http://www.smarttech.com/Products/rearprojection/index.asp and http://www.smarttech.com/Products/sbsoftware/index.asp. Printed Dec. 16, 2003. 5pp. total.

Starner, Leibe, Singletary, Lyons, Gandy, and Pair. "Towards Augmented Reality Gaming." Available http://www.gvu.gatech.edu/ccg/publications/imagina2000/. Printed Dec. 30, 2003. 27pp.

Streitz, Geißler, Holmer, Konomi, Müller-Tomfelde, Reischl, Rexrogh, Seitz, and Steinmetz. "i-Land: An interactive Landscape for Creativity and Innovation." *Proceedings of the ACM Conference on Human Factors in Computing Systems (CHI'99)*, Pittsburgh, Pennsylvania, May 15-20, 1999. ACM Press, New York, pp. 120-127.

Symanzik, Jürgen. "Three-Dimensional Statistical Graphics Based On Interactively Animated Anaglyphs." Published 1993. Available http://citeseer.mj.nec.com/95667.html. Printed Feb. 25, 2004. 7pp. total.

"The Tablet PC A detailed look at Microsoft's proposed Tablet PC." *Pen Computing Magazine: Tablet PC*. Available http://www.pencomputing.com/frames/textblock_tablet_pc.html. Printed Dec. 30, 2003. pp. 1.

Tandler, Prante, Müller-Tomfelde, Streitz, and Steinmetz. "ConnecTables: Dynamic Coupling of Displays for the Flexible Creation of Shared Workspaces." *Proceedings of the 14. Annual ACM Symposium on User Interface Software and Technoic (USIT'01)*, ACM Press (CHI Letters 3 (2)), 2001, pp. 11-20 (10pp).

Ullmer and Ishii. "The metaDESK: Models and Prototypes for Tangible User Interfaces." *Proceedings of UIST'97*, Oct. 14-17, 1997. © 1997 ACM—ACM 0-89791-881-9/97/10. 10pp.

Ullmer, Ishii, and Glas. "mediaBlocks: Physical Containers, Transports, and Controls for Online Media." *Computer Graphics Proceedings (SIGGRAPH'98)*, Jul. 19-24, 1998, © 1998 ACM. ACM-0-89791-999-8-8/98/007. 8pp.

Ullmer, Ishii, and Jacob. "Tangible query Interfaces: Physically Constrained Tokens for Manipulating Database Queries." *Proc. INTERACT 2003 Conference*, 2003. 11pp.

Underkoffler and Ishii. "Illuminating Light: An Optical Design Tool with a Luminous-Tangible Interface." *Proceeding of CHI '98*, Apr. 18-23, 1998, © 1998 ACM. pp. 1-8.

Underkoffler and Ishii. "Urp: A Luminous-Tangible Workbench for Urban Planning and Design." *Proceedings of CHI '99*. May 15-20, 1999. © 1998 ACM. pp. 1-8.

Underkoffler, Ullmer, and Ishii. "Emancipated Pixels: Real-World Graphics in the Luminous Room." *Proceedings of SIGGRAPH '99*, Aug. 8-13, 1999, © 1999 ACM. 8pp.

Vernier, Lesh, and Shen. "Visualization Techniques for Circular Tabletop Interfaces." To appear in *Advanced Visual Interfaces*, May 2002, Trento, Italy. © 2002 Mitsubishi Electric Research Laboratories, Inc. MERL-TR2002-01. Authored Mar. 2002. 10pp.

Viola and Jones. "Robust Real-time Object Detection." Cambridge Research Laboratory, Technical Report Series. Compaq. CRL 2001/01, Feb. 2001. 30pp.

"Virtualboard." Available http://visilab.unime.it/visilab/virtualboard.htm. Printed Dec. 16, 2003. 6pp.

Von Hardenberg and Bérard. Bare-Hand Human-Computer Interaction. *PUI 2001* Orlando, FL, © 2001 ACM 1-58113-448-7-11/14/01. 8pp.

Wellner, Pierre. "Interacting with Paper on the DigitalDesk." *Communications of the ACM*. Jul. 1993. EuroPARC tech report EPC-93-195. 17pp.

Whalen, Tara. "Playing well with Others: Applying Board Game Design to Tabletop Display Interfaces." *UIST 2003*. Vancouver, Nov. 2-5, 2003, 3pp.

Wu and Balakrishnan. "Multi-Finger and Whole Hand Gestural Interaction Techniques for Multi-User Tabletop Displays." *UIST '03*, Vancouver, B.C., Canada. © 2003 ACM 1-58113-636-6/03/0010. pp. 193-202.

\* cited by examiner

ORIENTING INFORMATION PRESENTED TO USERS LOCATED AT DIFFERENT SIDES OF A DISPLAY SURFACE

FIELD OF THE INVENTION

This invention generally pertains to a method and system for controlling an orientation of information displayed to one or more users, and more specifically for controlling the orientation of information presented to users who may be located at different sides of a generally horizontal display surface.

BACKGROUND OF THE INVENTION

Personal computers were designed for interactive use primarily by only one person at a time. Accordingly, a typical personal computer has but one monitor, a single user pointing device such as a mouse, and one keyboard. Although some games enable multiple input devices to be employed by two or more users in playing on a single personal computer, a typical multi-player game is played on a game computing device that is specifically designed for multiple players, or over a network, with each player using a different personal computer or gaming computing device. Interactions between multiple personal computer users running the same software application thus typically occur through communications over local area networks (LANs) or via the Internet, and not on the same personal computer.

Computing devices designed for multiple users can provide a significantly different level of interactivity between users and will normally use a television monitor to provide the larger display size to enable several people to readily view the display at the same time. Multi-user applications provide an opportunity for players to interact with each other while playing a game and thus improve the level of enjoyment. However, multi-user applications are not limited to electronic games. A multi-user platform running a spreadsheet program or a word processing program, for example, can enhance productivity by enabling a plurality of users to collectively collaborate more effectively on the same computing device in regard to a document or file that is being created or edited.

One of the most significant issues in providing a multi-user computing platform is ensuring that the display can readily be viewed by all of the users. Although a conventional large monitor or television screen might do for viewing graphic images, or text that is enlarged, smaller graphic icons and smaller font text will not readily be visible to a plurality of users who must be several feet away from the monitor or screen. One solution to this problem would be to use a projection display that is horizontal so that the users can be seated or stand around the display and be sufficiently close to the display screen on which images are projected to readily view smaller icons and other images, and fonts. Although a rectangular or round display that is horizontal enables the users to be positioned closely around the display at different sides, the orientation of text and other information presented on the display will be partially or wholly inverted for some of the users located on one side of the display if presented in the desired orientation for users on the other side of the display.

In software applications intended to interact with a plurality of users at one time on a single computing device, information will often be displayed that is intended to be viewed only by a specific user at one time, but which need not be oriented for others to view. Without means of identifying the location of each user, an application simply can not display information specifically for an intended user that is properly oriented to be viewed by that user, if the users are located at different positions around the horizontal display. What is clearly needed is a way to determine where each user is located so that information intended to be presented to a specific user can be oriented properly when displayed on a horizontal display surface.

SUMMARY OF THE INVENTION

To address the issues discussed above, the present invention automatically determines the orientation of information intended for a specific user, such as text or graphic images and other forms of graphic user interface materials, when the information is presented on a display surface. The orientation is determined so that the user can readily perceive the information in a substantially right-side-up mode, rather than inverted, since the user may be at any point around a generally horizontal display surface on which the information is presented. When software applications are executed that may involve multiple users who are distributed around the generally horizontal display surface, the present invention is able to determine how information intended for a specific user interacting with the software application should be appropriately oriented on the display surface to accomplish this goal.

More specifically, the present invention is directed to a method for determining the orientation of information presented on such a display surface, wherein the information can be selectively oriented to face toward different sides of the display surface. The method includes the step of determining a location relative to the display surface, of a user for whom the information is to be presented. Then, the information is oriented when presented on the display surface, so that the information faces toward the location of the user and is thus readily viewable and perceivable by the user at the location thus determined.

Several different approaches can be used for determining the location of the user relative to the display surface. For example, in one approach, a location of a totem associated with the user on the display surface is determined. Since the totem is disposed on the display surface adjacent to a side of the display surface where the user is disposed, the location of the user is thereby indicated. While many different techniques for determining the location of the totem might be used, such as using a display surface that is sensitive to specific characteristics of the totem (e.g., shape, color, an emitted radio frequency signal, a magnetic or electromagnetic characteristic, or a capacitance effect), a preferred embodiment senses light reflected from the totem to identify the totem and its location on the display surface. To properly orient the information the method then determines a vector that extends from a predefined point on the display surface (for example its center) towards the totem associated with the user. The information is then presented on the display surface oriented as indicated by the vector.

Another way to ascertain the location of the user relative to the display surface determines a region of the display surface that is closest to the user. For example, the user may initially indicate the side of the display surface adjacent to which the user is located, so that the region adjacent to that side of the display surface is then associated with the user. The region is preferably a quadrant, although other shapes or portions of the display surface may be allocated for each such region. The information is then presented on the display surface so that it is oriented toward the side of the region and of the display surface adjacent to which the user is located.

Yet another approach for orienting the information provided for detecting an orientation and a location of the totem, when it is disposed on the display surface. A vector is constructed in the direction determined by the orientation of the totem and extends from the location of the totem toward the location of the user. The information is then presented on the display surface adjacent to the location of the user and oriented as indicated by the vector. Again, although some of the other techniques relating to a characteristic of the totem that were noted above might alternatively be used, a preferred embodiment of the present invention senses light reflected from the totem to detect an orientation of the totem and its location on the display surface.

Clearly, although the method has thus far been described for detecting the orientation of information display to a single user, it will be apparent that these same steps can be used for determining the orientation of information displayed to any other user when the information specifically intended for the other user is to be presented on the display surface.

Another aspect of the present invention is directed to a memory medium having machine instructions for carrying out steps that are generally consistent with the steps of the method discussed above. Still another aspect of the invention is a system for determining an orientation of information, wherein the information can be selectively oriented to face in different directions. The system includes a display surface on which the information is presented, a sensor for detecting a location of an object placed on the display surface, a processor in communication with the sensor, and a memory in communication with the processor. The memory stores data and machine instructions that cause the processor to carry out a plurality of functions that are again generally consistent with the steps of the method discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Exemplary Computing System for Implementing Present Invention

Figure 1:
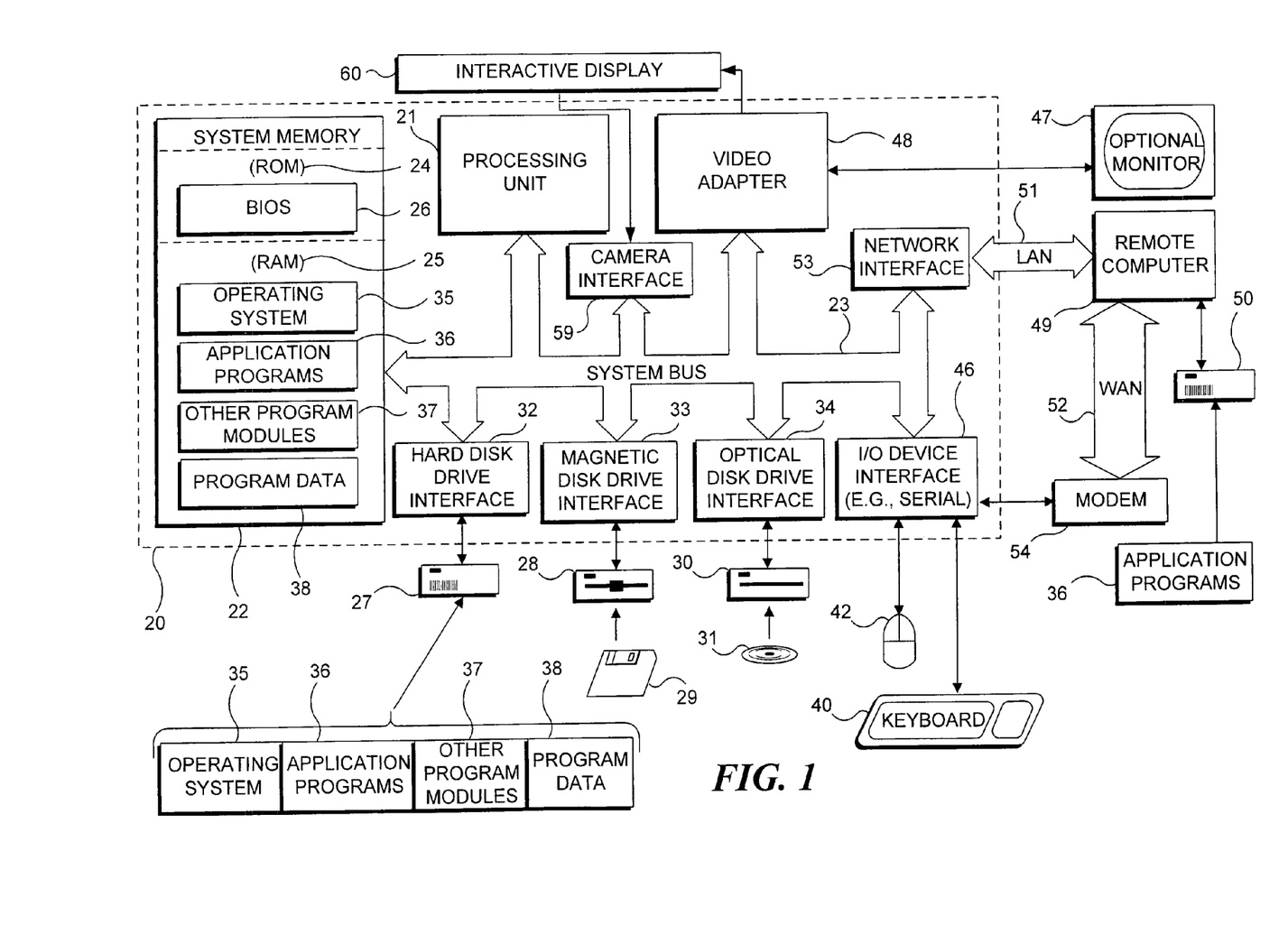
FIG. 1 is a functional block diagram of a generally conventional computing device or personal computer (PC) that is suitable for image processing for the interactive display table as used in practicing the present invention.

With reference to FIG. 1, an exemplary system suitable for implementing various portions of the present invention is shown. The system includes a general purpose computing device in the form of a conventional PC 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a compact disk-read only memory (CD-ROM) or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein employs a hard disk, removable magnetic disk 29, and removable optical disk 31, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information in PC 20 and provide control input through input devices, such as a keyboard 40 and a pointing device 42. Pointing device 42 may include a mouse, stylus, wireless remote control, or other pointer, but in connection with the present invention, such conventional pointing devices may be omitted, since the user can employ the interactive display for input and control. As used hereinafter, the term "mouse" is intended to encompass virtually any pointing device that is useful for controlling the position of a cursor on the screen. Other input devices (not shown) may include a microphone, joystick, haptic joystick, yoke, foot pedals, game pad, satellite dish, scanner, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). System bus 23 is also connected to a camera interface 59, which is coupled to an interactive display 60 to receive signals from a digital video camera that is included therein, as discussed below. The digital video camera may be instead coupled to an appropriate serial I/O port, such as to a USB version 2.0 port. Optionally, a monitor 47 can be connected to system bus 23 via an appropriate interface, such as a video adapter 48; however, the interactive display table of the present invention can provide a much richer display and interact with the user for input of information and control of software applications and is therefore preferably coupled to the video adaptor. It will be appreciated that PCs are often coupled to other peripheral output devices (not shown), such as speakers (through a sound card or other audio interface—not shown) and printers.

The present invention may be practiced using a single computing device, although PC 20 can also operate in a networked environment using logical connections to one or more remote computers, such as a remote computer 49. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface for establishing communications over WAN 52, e.g., over the Internet. Modem 54, which may be internal or external, is connected to the system bus 23 or coupled to the bus via I/O device interface 46, i.e., through a serial port. In a networked environment, program modules, or portions thereof, used by PC 20 may be stored in the remote memory storage device. It will be appreciated that the network connections shown are exemplary, and other means of establishing a communications link between the computers may be used, such as wireless communication and wide band network links.

Exemplary Interactive Surface

Figure 2:
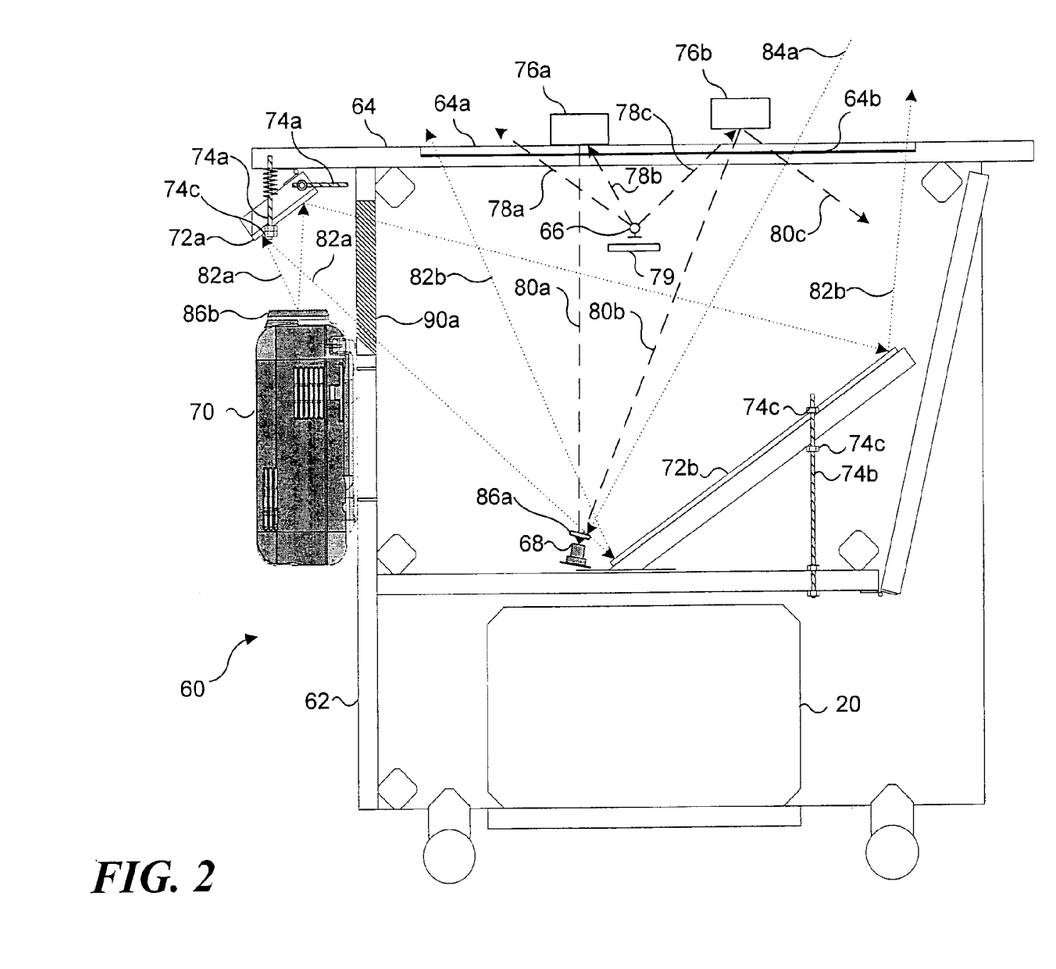
FIG. 2 is a cut-away view of the interior of the interactive display table, showing hardware components that are included therein, the paths followed by light within the interactive display table, and exemplary objects disposed on and above the display surface of the interactive display table.

In FIG. 2, an exemplary interactive display table 60 is shown that includes PC 20 within a frame 62 and which serves as both an optical input and video display device for the computer. In this cut-away Figure of the interactive display table, rays of light used for displaying text and graphic images are generally illustrated using dotted lines, while rays of infrared (IR) light used for sensing objects on or just above a display surface 64a of the interactive display table are illustrated using dash lines. Display surface 64a is set within an upper surface 64 of the interactive display table. The perimeter of the table surface is useful for supporting a user's arms or other objects, including objects that may be used to interact with the graphic images or virtual environment being displayed on display surface 64a.

IR light sources 66 preferably comprise a plurality of IR light emitting diodes (LEDs) and are mounted on the interior side of frame 62. The IR light that is produced by IR light sources 66 is directed upwardly toward the underside of display surface 64a, as indicated by dash lines 78a, 78b, and 78c. The IR light from IR light sources 66 is reflected from any objects that are atop or proximate to the display surface after passing through a translucent layer 64b of the table, comprising a sheet of vellum or other suitable translucent material with light diffusing properties. Although only one IR source 66 is shown, it will be appreciated that a plurality of such IR sources may be mounted at spaced-apart locations around the interior sides of frame 62 to prove an even illumination of display surface 64a. The infrared light produced by the IR sources may:

exit through the table surface without illuminating any objects, as indicated by dash line 78a;

illuminate objects on the table surface, as indicated by dash line 78b; or illuminate objects a short distance above the table surface but not touching the table surface, as indicated by dash line 78c.

Objects above display surface 64a include a "touch" object 76a that rests atop the display surface and a "hover" object 76b that is close to but not in actual contact with the display surface. As a result of using translucent layer 64b under the display surface to diffuse the IR light passing through the display surface, as an object approaches the top of display surface 64a, the amount of IR light that is reflected by the object increases to a maximum level that is achieved when the object is actually in contact with the display surface.

A digital video camera 68 is mounted to frame 62 below display surface 64a in a position appropriate to receive IR light that is reflected from any touch object or hover object disposed above display surface 64a. Digital video camera 68 is equipped with an IR pass filter 86a that transmits only IR light and blocks ambient visible light traveling through display surface 64a along dotted line 84a. A baffle 79 is disposed between IR source 66 and the digital video camera to prevent IR light that is directly emitted from the IR source from entering the digital video camera, since it is preferable that this digital video camera should produce an output signal that is only responsive to the IR light reflected from objects that are a short distance above or in contact with display surface 64a and corresponds to an image of IR light reflected from objects on or above the display surface. It will be apparent that digital video camera 68 will also respond to any IR light included in the ambient light that passes through display surface 64a from above and into the interior of the interactive display (e.g., ambient IR light that also travels along the path indicated by dotted line 84a).

IR light reflected from objects on or above the table surface may be:

reflected back through translucent layer 64b, through IR pass filter 86a and into the lens of digital video camera 68, as indicated by dash lines 80a and 80b; or reflected or absorbed by other interior surfaces within the interactive display without entering the lens of digital video camera 68, as indicated by dash line 80c.

Translucent layer 64b diffuses both incident and reflected IR light. Thus, as explained above, "hover" objects that are closer to display surface 64a will reflect more IR light back to digital video camera 68 than objects of the same reflectivity that are farther away from the display surface. Digital video camera 68 senses the IR light reflected from "touch" and "hover" objects within its imaging field and produces a digital signal corresponding to images of the reflected IR light that is input to PC 20 for processing to determine a location of each such object, and optionally, the size, orientation, and shape of the object. It should be noted that a portion of an object (such as a user's forearm) may be above the table while another portion (such as the user's finger) is in contact with the display surface. In addition, an object may include an IR light reflective pattern or coded identifier (e.g., a bar code) on its bottom surface that is specific to that object or to a class of related objects of which that object is a member. Accordingly, the imaging signal from digital video camera 68 can also be used for detecting each such specific object, as well as determining its orientation, based on the IR light reflected from its reflective pattern, in accord with the present invention. The logical steps implemented to carry out this function are explained below.

Figure 3:
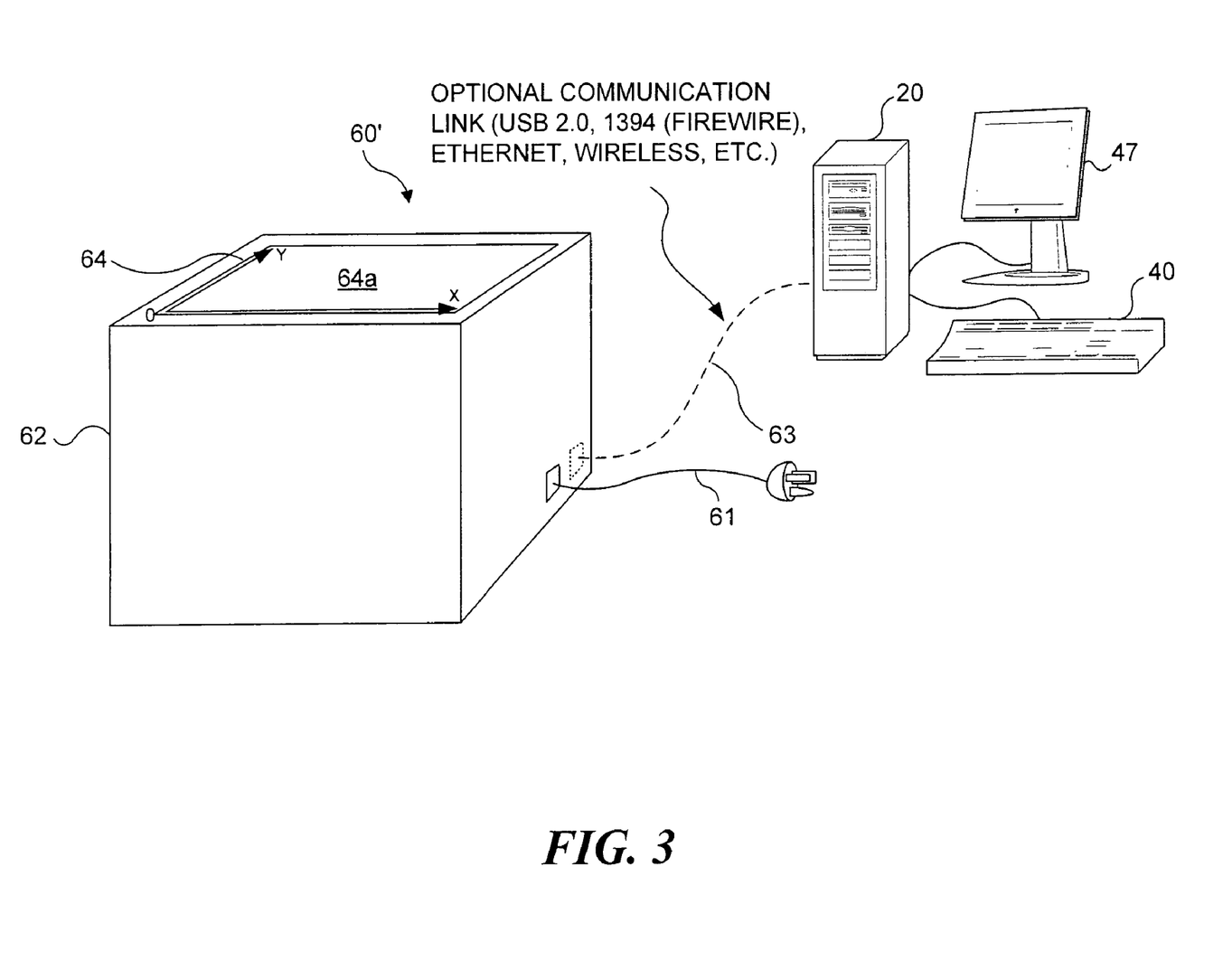
FIG. 3 is an isometric view of an embodiment in which an interactive display table is coupled externally to the PC.

PC 20 may be integral to interactive display table 60 as shown in FIG. 2, or alternatively, may instead be external to the interactive display table, as shown in the embodiment of FIG. 3. In FIG. 3, an interactive display table 60' is connected through a data cable 63 to an external PC 20 (which includes optional monitor 47, as mentioned above). As also shown in this Figure, a set of orthogonal X and Y axes are associated with display surface 64a, as well as an origin indicated by "0." While not specifically shown, it will be appreciated that a plurality of coordinate locations along each orthogonal axis can be employed to indicate any location on display surface 64a.

If the interactive display table is connected to an external PC 20 (as in FIG. 3) or to some other type of external computing device, such as a set top box, video game, laptop computer, or media computer (none shown), then the interactive display table comprises an input/output device. Power for the interactive display table is provided through a power lead 61, which is coupled to a conventional alternating current (AC) line source (not shown). Data cable 63, which connects to interactive display table 60', can be coupled to a USB 2.0 port, an Institute of Electrical and Electronics Engineers (IEEE) 1394 (or Firewire) port, or an Ethernet port on PC 20. It is also contemplated that as the speed of wireless connections continues to improve, the interactive display table might also be connected to a computing device such as PC 20 via such a high speed wireless connection, or via some other appropriate wired or wireless data communication link. Whether included internally as an integral part of the interactive display, or externally, PC 20 executes algorithms for processing the digital images from digital video camera 68 and executes software applications that are designed to use the more intuitive user interface functionality of interactive display table 60 to good advantage, as well as executing other software applications that are not specifically designed to make use of such functionality, but can still make good use of the input and output capability of the interactive display table. As yet a further alternative, the interactive display can be coupled to an external computing device, but include an internal computing device for doing image processing and other tasks that would then not be done by the external PC.

An important and powerful feature of the interactive display table (i.e., of either embodiments discussed above) is its ability to display graphic images or a virtual environment for games or other software applications and to enable an interaction between the graphic image or virtual environment visible on display surface 64a and objects that are resting atop the display surface, such as an object 76a, or are hovering just above it, such as an object 76b. It is the ability of the interactive display table to visually detect such objects, as well as the user's finger or other object being moved by the user that greatly facilities this rich interaction.

Again referring to FIG. 2, interactive display table 60 includes a video projector 70 that is used to display graphic images, a virtual environment, or text information on display surface 64a. The video projector is preferably of a liquid crystal display (LCD) or digital light processor (DLP) type, or a liquid crystal on silicon (LCoS) display type, with a resolution of at least 640×480 pixels. An IR cut filter 86b is mounted in front of the projector lens of video projector 70 to prevent IR light emitted by the video projector from entering the interior of the interactive display table where the IR light might interfere with the IR light reflected from object(s) on or above display surface 64a. A first mirror assembly 72a directs projected light traveling from the projector lens along dotted path 82a through a transparent opening 90a in frame 62, so that the projected light is incident on a second mirror assembly 72b. Second mirror assembly 72b reflects the projected light along a path 82b onto translucent layer 64b, which is at the focal point of the projector lens, so that the projected image is visible and in focus on display surface 64a for viewing.

Alignment devices 74a and 74b are provided and include threaded rods and rotatable adjustment nuts 74c for adjusting the angles of the first and second mirror assemblies to ensure that the image projected onto the display surface is aligned with the display surface. In addition to directing the projected image in a desired direction, the use of these two mirror assemblies provides a longer path between projector 70 and translucent layer 64b, and more importantly, helps in achieving a desired size and shape of the interactive display table, so that the interactive display table is not too large and is sized and shaped so as to enable the user to sit comfortably next to it.

Orienting Displayed Information by Vector

Figure 4A:
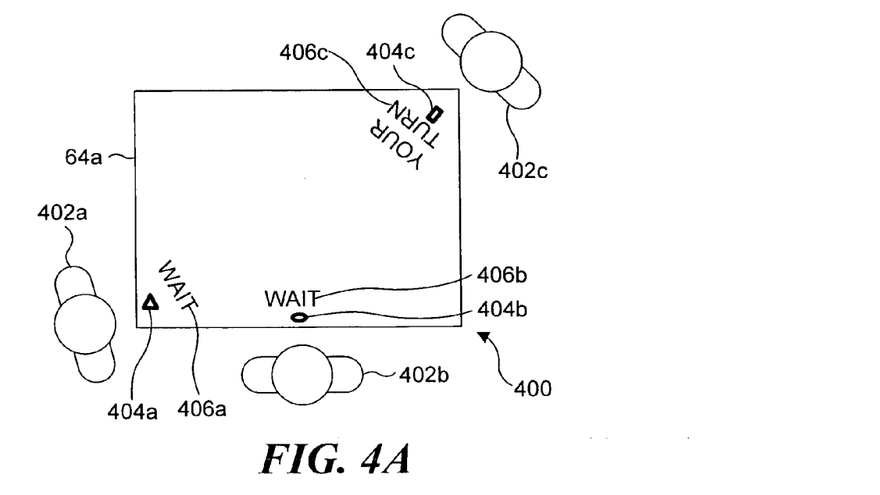
FIGS. 4A and 4B schematically represent plan views of a rectangular horizontally disposed display surface, illustrating orienting information specific to a user based upon a vector.
Figure 4B:
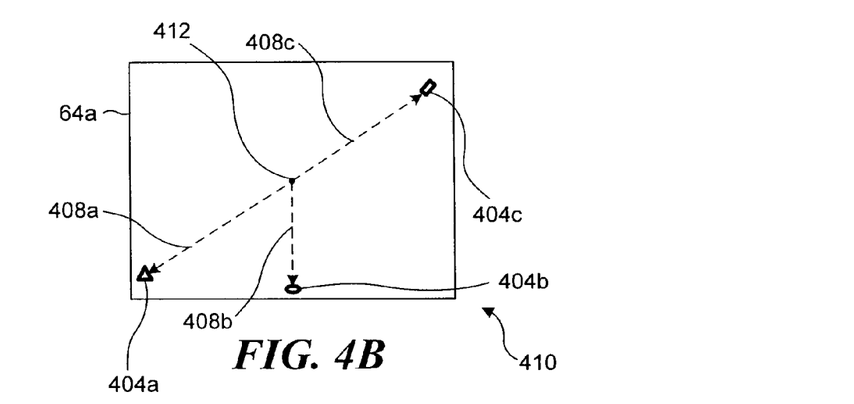
Figure 4C:
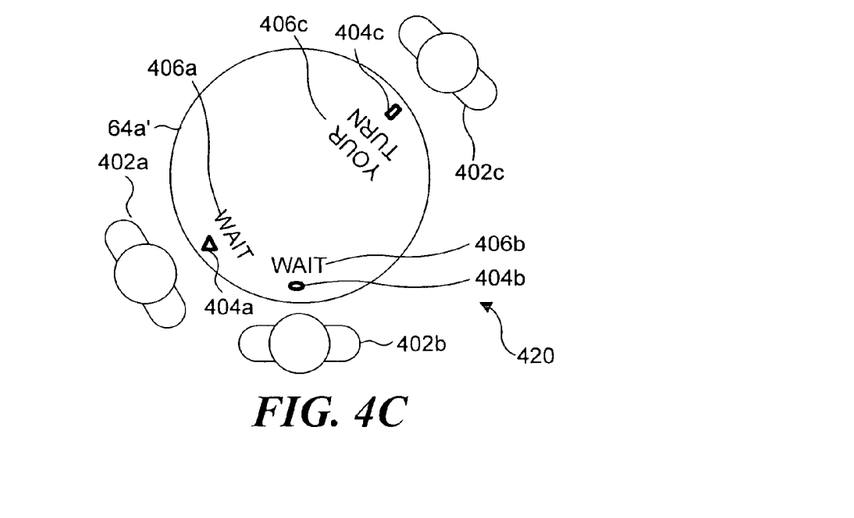
FIG. 4C schematically represents a plan view of a round horizontally disposed display surface, illustrating orienting information specific to a user based upon a vector.

For applications that require more than one user, the interactive table needs to identify individual users and orient information to each user as appropriate for readability or to enhance usability. For example, text that is displayed in an orientation appearing to be upside down relative to the location of a user located adjacent to the display will not be very readable. Accordingly, the present invention enables the interactive table to determine where the user is located who needs to read and/or use the information to be displayed and then displays that information in an orientation that is generally appropriate for the user to read and/or use. FIGS. 4A-4C illustrate, in an exemplary manner, the use of totems for orienting the information by vector for a rectangular display surface (FIGS. 4A and 4B) and for a round display surface (FIG. 4C).

As shown in an example 400 of FIG. 4A, several users 402a, 402b, and 402c surround display surface 64a of the interactive table. Each user has placed a totem 404a, 404b, and 404c, respectively, in front of them, on and near the edge of display surface 64a. Using the IR video camera, the software application being executed by the interactive display table senses a pattern or shape of IR light reflected from the base of each totem to identify the totem. Because each user's totem is specifically associated with that user by the application, information 406a, 406b, and 406c that is intended to be read and/or used by each of the corresponding users is properly oriented appropriately for viewing by the user for which the information is intended.

An example 410 in FIG. 4B illustrates the underlying concept for orienting the specific information intended for each different user. Vectors 408a, 408b, and 408c extend outwardly from a display surface center 412 directed respectively to totems 404a, 404b, and 404c and provide an appropriate orientation (based upon the direction of the vector) for the information to be displayed near the edges of the display surface to be viewed by the users respectively associated with the totems, who will need to read and/or use the information.

In FIG. 4C, an example 420 shows a display surface 64a', which is round, but otherwise generally equivalent to display surface 64a of FIG. 4A. Just as in FIG. 4A, example 420 in FIG. 4C includes totems 404a, 404b, and 404c disposed on and adjacent to the outer edge of the display surface. Accordingly, using the vector approach, software application displays information 406a, 406b, and 406c oriented appropriately to respectively enable users 402a, 402b, and 402c to read and/or use the information intended for each respective user.

Orienting the Information by Quadrant

Figure 5A:
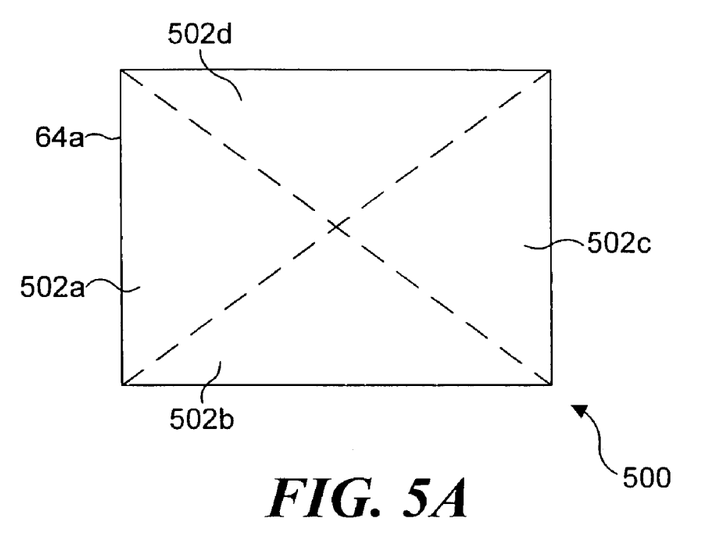
FIGS. 5A and 5B schematically represent plan views of the rectangular horizontally disposed display surface, illustrating orienting information specific to a user based upon a quadrant.
Figure 5B:
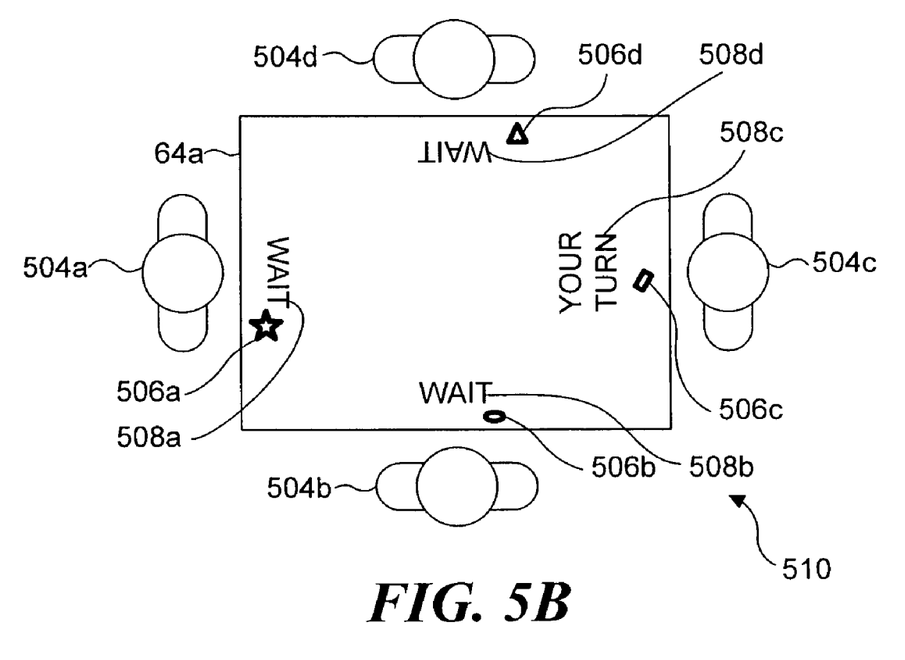

As shown in FIGS. 5A and 5B, when multiple users, for example four users 504a, 504b, 504c, and 504d, are each disposed next to a different one of the four sides of display surface 64a, an alternate method of orienting information by quadrant can be used. In an example 500 of FIG. 5A, display surface 64a is divided into four triangular-shaped quadrants 502a, 502b, 502c, and 502d. Note that delineation of the quadrants on the display surface is for illustration only and will normally not be shown on the display surface. Also, although this example illustrates four users, it will be understood that fewer than four users can be accounumodated with this method, so long as each user is located next to a different edge or side of display surface 64a.

In example 510, users 504a, 504b, 504c, and 504d surround the interactive table, and each user has respectively placed a totem 506a, 506b, 506c, and 506d within a corresponding quadrant, on and near the edge of the display surface of the interactive table. Using reflected IR light sensed by the IR video camera in the interactive table to detect and identify each totem, the software application that is currently executing has oriented information 508a, 508b, 508c, and 508d in each respective quadrant 502a, 502b, 502c, and 502d, near the edges of the display surface, so that the information intended for each user can readily be read and/or used by the user. Thus, user 504b can readily read and/or use information 508b, although information 508b appears inverted to user 504d. However, information 508d is oriented appropriately to be read and/or used by user 504d, although it appears inverted to user 504b.

Orienting the Information by User Piece

Figure 6A:
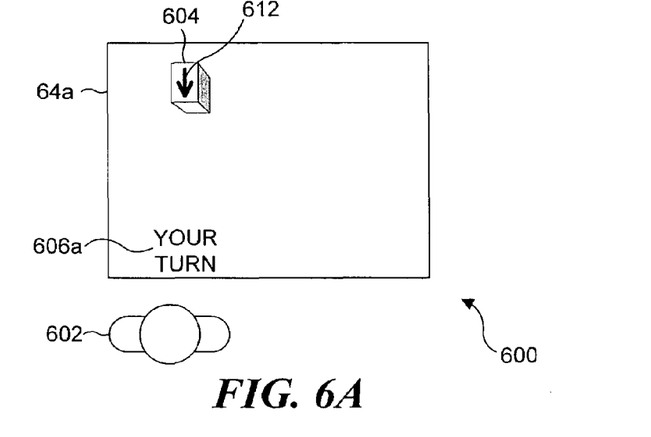
FIGS. 6A, 6B, and 6C schematically represent plan views of the rectangular horizontally disposed display surface, illustrating orienting the information as a function of the orientation of a user piece.
Figure 6B:
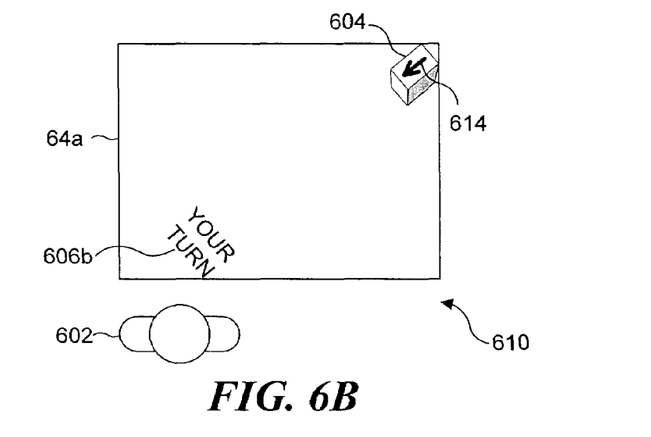
Figure 6C:
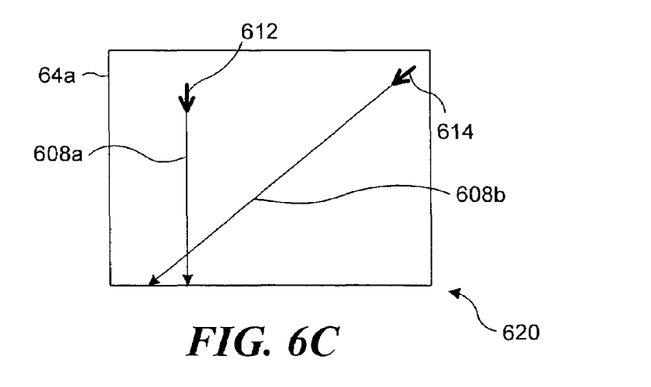

For software applications that require moving a user's totem around to various positions on display surface 64a, an alternate method of orienting information based upon the orientation of the user's totem can be used. The interactive table can sense the orientation of a user's totem by recognizing a IR code or pattern in the IR light reflected from the totem, recognizing a unique object shape, color, or some other identifying characteristic of the totem. FIGS. 6A-6C illustrate how the orientation of the user's totem can be employed to determine the for orientation of information presented to the user.

In examples 600 and 610 of FIGS. 6A and 6B, a user 602 has placed a totem 604 so that it points toward the user. Since the totem clearly has a defined orientation when placed on display surface 64a and that orientation can be determined by the interactive table, the phrase "points to toward the user" is simply intended to mean that the totem is oriented by the user to indicate the location of the user around display surface 64a, i.e., to indicate the side or edge of the display surface next to which the user is located. An arrow 612 shown on the top of totem 604 in FIG. 6A indicated the orientation of the totem, with its base directed toward user 602. The application has sensed totem 604 and its orientations using the IR light reflected from the base of the totem (or other suitable identifying characteristic) and has oriented information 606a near the edge of the display surface and oriented to enable user 602 to readily read and/or use the information.

If the user then moves totem 604 to the upper right corner of display surface 64a, as shown in example 610 of FIG. 6B, and changes the orientation of the totem so that its base is generally directed towards the user, as indicated by an arrow 614, information 606b is displayed in front of user 602 but at an angle, based upon the orientation of the totem in this example. The user controls the orientation of the information presented on display surface 64a based upon the orientation of the totem on the display surface. While only a single user and a single totem are shown in FIGS. 6A and 6B, it will be understood that the same approach is usable for each totem of each user that is placed on the display surface, to determine the orientation of the information that will be presented for the user associated with the totem. The user's position at a specific side of the display surface can be employed to determine the side of the display surface next to which the information for that user will be presented, but the orientation of the totem determines the orientation of the information presented.

An example 620 in FIG. 6C illustrates the underlying concept for orienting the information based upon the orientation of the totem. The orientation of the user's totem provides the directions for vectors 608a and 608b, with the totem respectively oriented as shown in FIGS. 6A and 6B. In this Figure, arrows 612 and 614 indicate the orientation of the totem, which is not shown. The software application uses the vector determined based upon the totem orientation for orienting information presented near the edge of the display surface for the user, in each of these examples.

Process for Information Orientation

Figure 7:
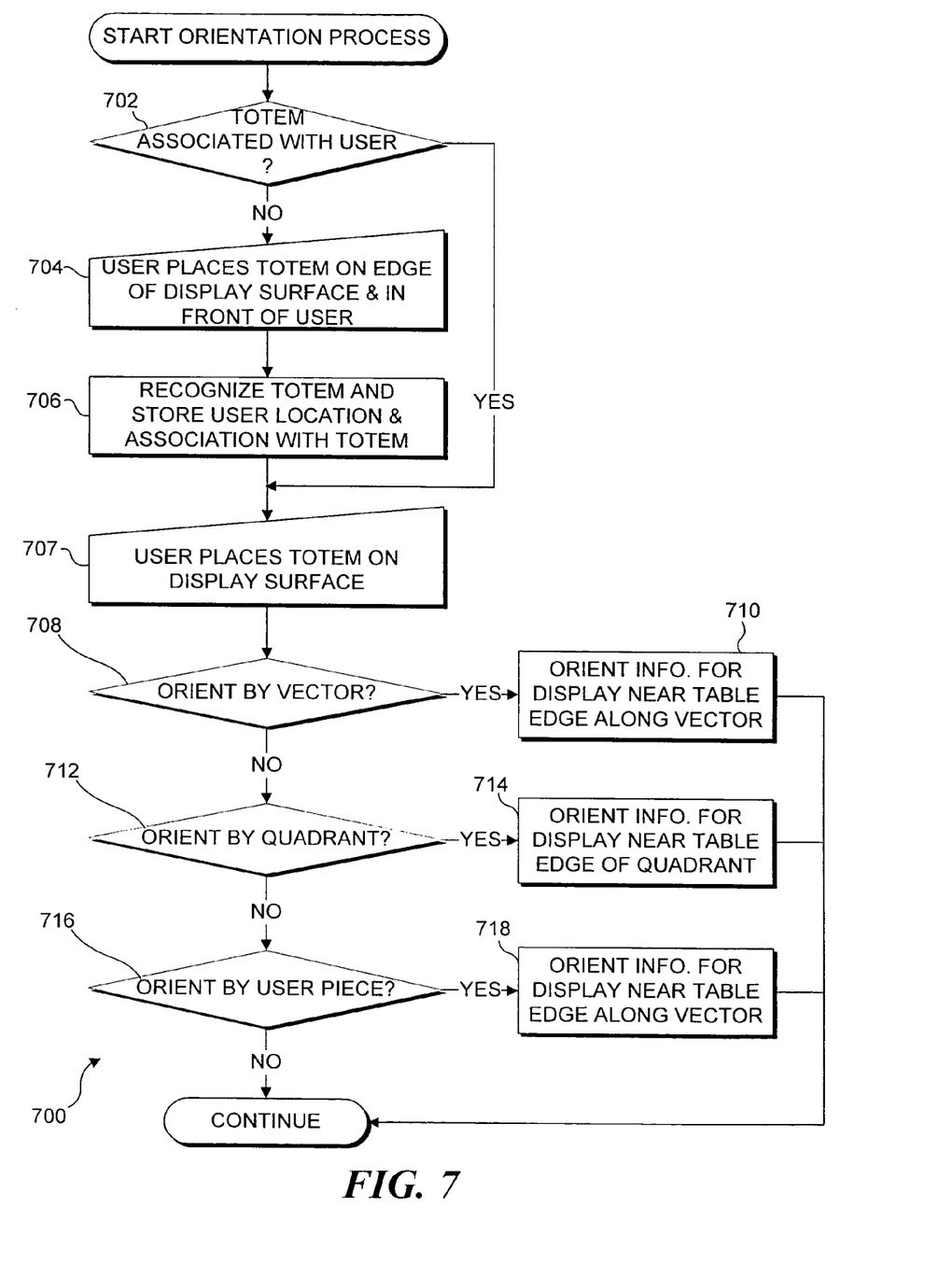
FIG. 7 is a flow chart showing a process for information orientation.

FIG. 7 includes a flow chart 700 that illustrates, in an exemplary manner, the steps of the process for determining the appropriate orientation of information presented on the display surface, in accord with the present invention. As indicated in this flow chart, in a decision step 702, the processor in the interactive table determines if a totem is already associated with a user. The step of associating a totem with a user can be accomplished prior to or during the execution of a software application that will be displaying information to the user. A totem can represent a specific user at all times (e.g., for several different software applications) or can represent a user during execution of only a specific software application. The user may be enabled to select a totem that the user prefers so that the selected totem will be associated with the user.

If a totem is not yet associated with the user in decision step 702, in a step 704, the user selects one and positions it on the display surface, near the edge in front of the user. In a step 706, the interactive table recognizes the totem, e.g., based upon a unique characteristic such as its reflected IR light pattern, shape, color, etc. and stores the user location and association with the totem in memory. It is also contemplated that a user can identify the totem in some other manner to create the association, such as by entering text describing the totem, or by making selections in a dialog (not shown) indicating the color or shape of the totem to identify it, and by further indicating the user's location around the display surface of the interactive table. Thereafter, or if the totem is already associated with the user in decision step 702, the logic proceeds to a step 707.

In step 707, a user places the totem on the display surface. Depending upon the method being used by the software application, the position of the totem on the display surface will directly affect the orientation and location at which the information for the user is presented on the display surface. In a decision step 708, the logic determines if the information is to be oriented based upon a vector directed to from the center of the display surface towards the position of the totem on the display table (as shown and described in connection with FIGS. 4A-4C). If the orientation of the information is to be determined based upon the vector, the process continues at a step 710, wherein the information is presented on and adjacent to the edge of the display surface, in the position determined using the vector created as discussed above.

Alternatively, if orientation is not to be done by vector, the process continues at a decision step 712 wherein the logic determines if the information is to be oriented based upon the quadrant of the display surface adjacent to which the user is located. If the information is to be oriented based upon this quadrant, the process continues at a step 714 wherein the information is presented near the edge of the display surface and within a quadrant disposed next to the user, oriented as described above in connection with FIGS. 5A and 5B.

If the orientation of the information is not to be determined based upon the quadrant method, the process continues at a decision step 716, wherein the logic determines if the information is to be oriented based upon a current position of the totem associated with the user. If the information is to be oriented based upon the orientation of the totem and in regard to the side of the display surface adjacent to which the user is located, the process continues at a step 716. In this step, the information is presented near the edge of the display surface closest to the user's location, and the information is oriented as determined by the orientation of the totem, along a vector directed toward the user's location, using the method described above in connection with FIGS. 6A-6C. The logic continues with processing the software application after each of steps 710, 714, and 718 and is repeated each time information specific to a user is to be presented on the display surface, or if there is a negative response to decision step 716.

Preferably, the location and orientation of the totem, as described above, are determined based upon IR light that is reflected from the totem when it is disposed on display surface 64a. Clearly, many other alternative approaches can be used to detect the location of the totem and its orientation, depending upon the nature of the display surface that is used. For example, the characteristic of the totem that is detected to determine its position and orientation might be related to its shape, color markings, visible bar code markings, radio frequency emissions, electro-magnetic properties, capacitance effects, and other such characteristics that might be sensed when the totem is placed on the display surface.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for determining an orientation of information presented on a generally horizontal display surface, wherein the information can be selectively oriented to face toward different sides of the display surface, comprising the steps of:
   receiving light that is reflected from a totem that is disposed on the display surface of a horizontal display table, the received light indicating the location on the display surface of the totem, and wherein the totem is associated with a particular user;
   detecting identifying information from the received light, wherein the identifying information identifies the particular user of the horizontal display table;
   determining a location relative to the display surface of the particular user based on the location of the totem;
   based on the identifying information that identifies the particular user, selecting information that corresponds to the particular user and that is to be displayed to the particular user; and
   displaying the selected information such that the selected information is oriented on the display surface as to face toward the location of the particular user.

2. The method of claim 1, wherein the totem is disposed on the display surface adjacent to a side of the display surface where the user is disposed.

3. The method of claim 2, wherein the step of displaying the selected information such that the selected information is oriented on the display surface as to face toward the location of the particular user comprises:
   determining a vector that extends from the center of the display surface towards the location of the totem; and
   displaying the selected information on the display surface such that the selected information is oriented as indicated by the vector.

4. The method of claim 1, wherein the step of determining the location relative to the display surface of the particular user comprises detecting from the received light an orientation of the totem such that the orientation indicates the location relative to the display surface where the particular user is disposed and wherein the step of displaying the selected information comprises the steps of:
   determining a vector that extends from the location of the totem in the direction as indicated by the orientation of the totem; and
   displaying the selected information on the display surface such that the selected information is oriented as indicated by the vector.

5. The method of claim 1, further comprising:
   receiving light that is reflected from a second totem that is disposed on the display surface of the horizontal display table, the received light indicating the location on the display surface of the second totem;
   detecting identifying information from the received light, wherein the identifying information identifies a second user of the horizontal display table;
   determining a location relative to the display surface of the second user based on the location of the totem;
   based on the identifying information that identifies the second user, selecting second information that corresponds to the second user and that is to be displayed to the second user; and
   displaying the second information such that the second information is oriented on the display surface as to face toward the location of the second user.

6. A memory medium having machine instructions for carrying out the steps of claim 1.

7. A system for determining an orientation of information presented on a generally horizontal display surface of a horizontal display table, wherein the information can be selectively oriented to face in different directions, comprising:
   a display surface on which information is displayed and on which totems for identifying users of the horizontal display table may be placed;
   a sensor for detecting the location of totems that are placed on the display surface;
   a processor that communicates with the sensor; and
   memory in communication with the processor, the memory storing data and machine instructions that cause the processor to perform steps comprising:

receiving light at the sensor that is reflected from a totem that is disposed on the display surface, the received light indicating the location on the display surface of the totem, and wherein the totem is associated with a particular user;

detecting identifying information from the received light, wherein the identifying information identifies the particular user of the horizontal display table;

determining a location relative to the display surface of the particular user based on the location of the totem;

based on the identifying information that identifies the particular user, selecting information that corresponds to the particular user and that is to be displayed to the particular user; and displaying the selected information such that the selected information is oriented on the display surface as to face toward the location of the particular user.

8. The system of claim 7, wherein the totem is disposed on the display surface adjacent to a side of the display surface where the user is disposed.

9. The system of claim 8, wherein the step of displaying the selected information such that the selected information is oriented on the display surface as to face toward the location of the particular user comprises:

determining a vector that extends from the center of the display surface towards the location of the totem; and displaying the selected information on the display surface such that the selected information is oriented as indicated by the vector.

10. The system of claim 7 wherein determining the location relative to the display surface of the particular user comprises detecting from the received light an orientation of the totem such that the orientation indicates the location relative to the display surface where the particular user is disposed and wherein displaying the selected information comprises:

determining a vector that extends from the location of the totem in the direction as indicated by the orientation of the totem; and displaying the selected information on the display surface such that the selected information is oriented as indicated by the vector.

11. The system of claim 7, wherein the steps further comprise:

receiving light that is reflected from a second totem that is disposed on the display surface of the horizontal display table, the received light indicating the location on the display surface of the second totem;

detecting identifying information from the received light, wherein the identifying information identifies a second user of the horizontal display table;

determining a location relative to the display surface of the second user based on the location of the totem;

based on the identifying information that identifies the second user, selecting second information that is to be displayed to the second user; and displaying the second information such that the second information is oriented on the display surface as to face toward the location of the second user.

\* \* \* \* \*